United States Patent Office 2,814,331
Patented Nov. 26, 1957

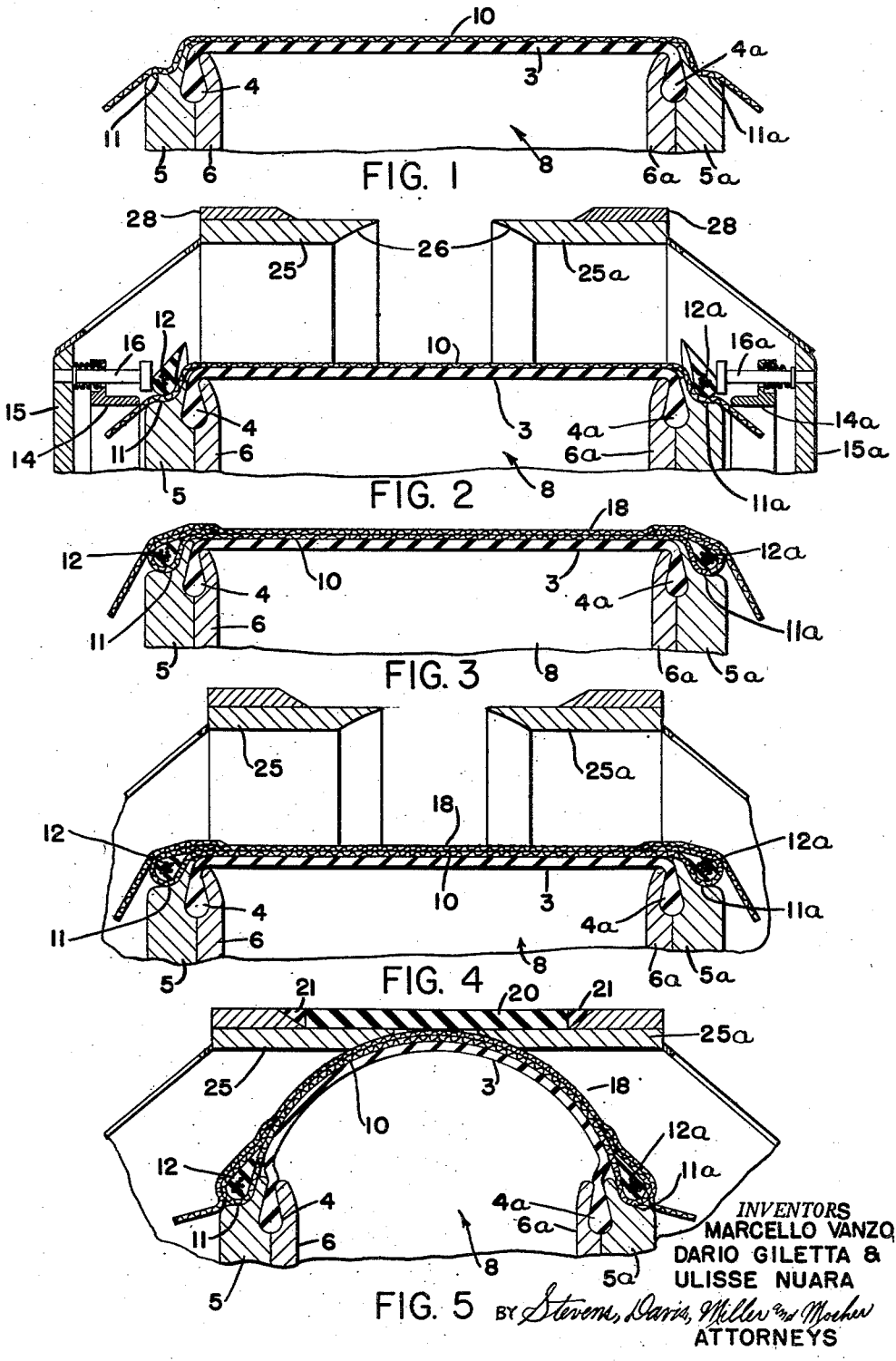

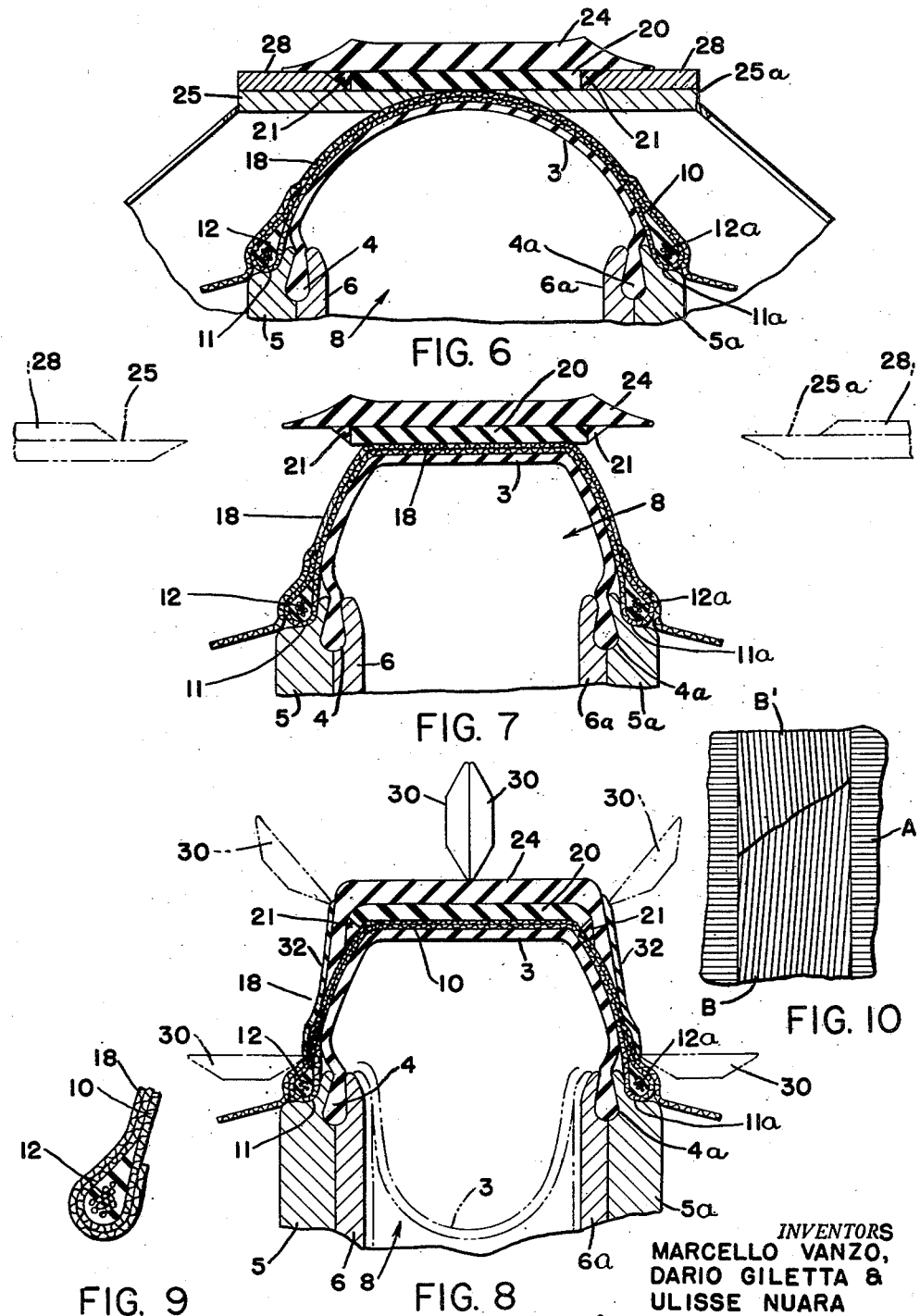

2,814,331

PROCESS FOR BUILDING PNEUMATIC TIRES

Marcello Vanzo, Dario Giletta, and Ulisse Nuara, Milan, Italy

Application April 20, 1956, Serial No. 579,507

20 Claims. (Cl. 154—14)

The present invention relates to a new and improved method for the manufacture of pneumatic tires which may have general utility in this field and may be used for the manufacture of standard types of pneumatic tires. However, the method is particularly adapted and designed for the purpose of meeting certain problems connected with the practical manufacture of tires constructed as shown and described in the copending application of Luigi Emanueli, Serial No. 274,085, filed February 29, 1952, now abandoned, to which application reference may be made.

In order to make clear the method of the present invention, the distinctive features of the tire shown in the said Emanueli application should be understood. The tire of the said application is characterized by a carcass or body composed of rubberized plies of radially arranged cords and by a substantially inextensible breaker located between the carcass and the tread, the breaker being composed of at least one band having at least two superposed plies of parallel cords which are substantially inextensible. For this purpose, the breaker strip or belt is constructed of parallel strands, either textile or wire cords or cables, of very low elongation and arranged at oppositely disposed angles having values from 5° to 20° to a plane perpendicular to the rotational axis of the tire.

This breaker structure is held under tension and because of its construction and because it operates as a stricture band, the tread portion of the tire has a substantially flat, ground-contacting area. Due to the new construction described, the tread portion of the tire is maintained in a substantially flat condition, and the contraction and expansion of the area of the tread in contact with the ground is greatly minimized. These features of the tire result in substantially reduced tread wear, less consumption of fuel and other advantages more fully set forth in the aforesaid application.

It will be understood, however, that the breaker belt or stricture band is not completely inextensible when built into the tire, for a limited extensibility is desirable due to the necessity of allowing for a limited expansion of the tire in the mold or press during the curing operation that will remove any waviness in the cords of the carcass and give a satisfactory molding operation.

The accepted and standard method of building tires is the so-called "flat band" or "drum building" method in which the plies of rubberized cord fabric constituting the carcass are laid over a flat, drum-like structure, the edges of the plies being wrapped in various methods about the beads, which are located in bead seats on the edges of the drum. The tread is now applied to the central portion of the carcass and, as is the common practice, the usual breaker strips or strip, which lie between the tread and the carcass, are applied at the same time. Sidewalls, chafer strips and other parts of the tire are then added. The drum is collapsed and the tire in "flat band" or "pulley band" form is removed and shaped and cured. This operation is done by bringing the band into substantially tire form and then inserting a curing bag on which the tire is cured in a mold while held under internal pressure or the band is placed in a press in which it is shaped and cured under internal pressure contained in a diaphragm located in the press.

This flat building method is universally adopted and used because it is economical, the building of a tire requires no particular skill or aptitude, and the standard tires perform well although they do not have the special attributes of a tire made in accordance with the aforesaid application.

In the building of the tires of the aforesaid application, it is desirable to utilize many of the beneficial and standardized features of the "flat band" method, but due to the special construction and properties of the breaker belt, which inhibit any substantial expansion of the central part of the carcass, it is impossible to employ existing machines and existing methods.

In order to build a tire of the construction of the said Emanueli application and to manufacture such a tire so that it will meet the exacting standards which are required in order best to realize the beneficial results of the Emanueli invention, the applicants have devised the method shown and described herein. This new and useful method has been devised to utilize to such an extent as may be possible the almost universally used process of the "flat band" or "pulley band" method, but it has been necessary to create certain new procedures to be used in combination with the technique of the standard tire building methods in order to achieve the aims of the present invention.

The present application is a continuation-in-part of applicants' prior application Serial No. 391,364, filed November 10, 1953, the said application being directed to a new and useful machine for building the tires of the Emanueli invention.

In the description and the accompanying drawings there are shown the steps of the process of this application; also details of a simple apparatus for carrying out the process.

It will be understood, however, that the description and drawings are for the purpose of making the invention clear to those skilled in this art and that the invention is not necessarily restricted thereto but is subject to modification and improvement without departure from the basic principles thereof.

In the drawings, in which is shown a portion of the building drum which is used in carrying out the process:

Fig. 1 is a view showing the first or band ply or plies laid over the drum.

Fig. 2 shows the application of the beads.

Fig. 3 shows the application of the over bead ply or plies.

Fig. 4 shows the shaping rings moved into position.

Fig. 5 shows the preliminary shaping of the carcass and the application of the breaker strip or stricture belt.

Fig. 6 shows the application of the tread.

Fig. 7 shows the condition of the uncured tire when the shaping rings are removed.

Fig. 8 shows the stitching of the tread and sidewalls on the carcass.

Fig. 9 shows a detail of the finishing operation.

Fig. 10 is a view showing the arrangement of the breaker belt and the cords of the carcass which is characteristic of a tire made in accordance with the invention of the aforesaid Emanueli application.

Referring first to Fig. 10, the tire of the Emanueli invention consists of a carcass of rubberized cord fabric, the cords of which are laid radially or approximately radially of the tire, that is to say, parallel to or approximately parallel to the axis of the tire. Such an arrangement of the cords is shown at A in Fig. 10. The breaker unit preferably consists of at least two rubberized layers or plies of parallel cords or strands which may be either textile cords or wire cables. These two plies are indicated at B and B'. The cords or strands are laid at a very long angle or, stated in another way, in an angular position which very closely approaches a plane transverse to the axis of rotation of the tire. The cords, in two layers, are arranged at opposite angles and are preferably laid at angles having values ranging from 5° to 20° to a plane transverse to the axis of rotation of the tire. The strands which comprise the breaker element have a very limited degree of elongation, as described above, with the result that the tread of the tire is held in substantially flat condition to accomplish the useful results of the Emanueli invention. The breaker band or belt is often referred to as a stricture belt because of its properties of holding the tread area of the tire substantially flat across the tire. As noted above, this stricture belt inhibits the building of the tire by standard methods in which the breaker strips and tread are laid over the carcass while it is on the flat building surface and the subsequent shaping of the uncured tire is possible because of the extensibility of the central portion of the structure. However, such expansion is not possible in the building of a tire of the Emanueli construction.

The tire is built on a flat, rotatable building form which is composed of a flat cylinder made of a sheet 3 of rubber or other similar extensible material. The edges of the sheet are formed with enlarged beads or ribs 4 and 4a and each edge is clamped between a flat disc 5 or 5a and a plate 6 or 6a, so that the sheet and the end members constitute a hollow enclosed chamber 8 which is airtight. The chamber is connected to a conduit through which air under pressure can be introduced into the chamber or evacuated therefrom.

The discs 5 and 5a are mounted so that they are moved outwardly to hold the sheet 3 taut, but air at a slight degree of superatmospheric pressure may be maintained in the chamber so that the sheet 3 will make a firm building surface. To shape the tire carcass, as will be more fully set forth later, the pressure of the air in the chamber 8 is increased and the sheet 3 is expanded outwardly to shape the carcass at the same time that the discs are moved inwardly, as shown in Figs. 5 to 8, inclusive. It is desirable to advance the discs 5 and 5a at a rate proportionate to the increasing expansion of the sheet 3.

To remove the finished tire, the chamber may be evacuated so that the sheet 3 is drawn inwardly and at the same time the discs are moved inwardly slightly, as shown in dotted lines in Fig. 8, so that the tire may be removed by ovalizing one beaded edge thereof and passing it into the space between the discs and then by ovalizing again said beaded edge so that it can be slipped off the building form.

The first or under bead ply or plies are given the reference numeral 10. This part of the carcass is laid over the drum provided with the bead seats 11 and 11a formed on the outer periphery of the discs 5 and 5a.

The next step is the application of the beads 12 and 12a to the edges of the first ply where they are located on the bead seats. A mechanism to apply the beads is shown in Fig. 2 and consists of flat rings 14 and 14a which are carried on the inner side of two hoods or frames 15 and 15a movable toward and away from the drum, as more fully set forth in the aforesaid application Serial No. 391,364. Pins 16 and 16a on which the rings 14 and 14a are mounted shift the beads from the rings and press them onto their respective bead seats when the hoods are moved inwardly toward the drum. The hoods are now withdrawn.

The next step is the application of the over bead ply or plies 18 to the surface of the drum and over the beads so that the edges of those plies overhang the sides of the drum. The plies may be rolled in place to insure adhesion of the plies as is usual.

The carcass is now ready to receive the breaker and tread. The breaker element is given the numeral 20. It may consist of two or more plies or layers of strands, the properties of which have been described. If the breaker is of substantial thickness, fillets of rubber 21 may be added to the edges of the breaker element to avoid an abrupt step-off at the edge of the breaker. The tread is of the usual design and is given the numeral 24. It may be applied as a separate element, as shown in Figs. 5 and 6, or the breaker and tread may be preassembled before applying them to the carcass.

As the breaker element is substantially inextensible and is of substantially greater inner circumference than the outer circumference of the unshaped carcass, the carcass is expanded so that at its crown it is the same, or substantially the same, outer diameter as the inner diameter of the breaker element. It is essential that the carcass be expanded to the exact dimension to receive the breaker before it is applied.

For reasons stated, when the building drum is expanded, two shaping rings of greater diameter than the carcass are moved into position over the form. These rings are indicated by the numerals 25 and 25a and are conveniently carried on the hoods 15 and 15a. Either before or as the carcass is being shaped by the expansion of the sheet 3 and the approach of the discs 5 and 5a, these rings are moved into position as shown in Fig. 6, but with the opposing edges spaced apart so as to leave the crown area of the carcass exposed. The inner edge of rings 25 and 25a are concaved slightly, as shown at 26, so as to conform to the curvature of the expanded carcass.

The rings 25 and 25a not only serve to limit the expansion of the carcass to the exact degree which was predetermined, but they also serve as a base over which the breaker and tread are applied to the carcass at the exact dimension required. To accurately center the breaker, guides 28 may be provided on the rings 25 and 25a.

The breaker is applied to the surface formed by the rings 25 and 25a, which rotate with the drum, and the exposed central area of the carcass.

The breaker 20 is now rolled into adhesion with the central zone of the carcass and the tread 24 is wrapped about the rings 25. These elements may be rolled in place by the workmen who may use automatic stitching rollers 30 for the purpose, the construction and operation of which are set forth in the aforesaid application Serial No. 391,364.

The rings 25 and 25a are now withdrawn to the dotted line positions and the discs 5 and 5a moved together, as shown in Fig. 7, leaving the tire in the condition shown. At this time it is desirable to increase the pressure to approximately operative running pressure or about 1.5 atmosphere. Due to the presence of the stricture belt, the tire will assume the shape, or approximately the shape, shown in Fig. 7 with the tread area transversely flat.

The tread and breaker element are now stitched in place manually or by the rollers 30 which are advanced around the tire as shown by dotted lines in Fig. 8 by mechanism such as shown, for example, in the aforesaid application Serial No. 391,364. At the same time the side walls 32 may be stitched onto the tire and those elements may be preassembled with the tread or applied separately.

The tire is now removed from the building form in the manner heretofore described. The edges of the over bead plies may now be trimmed off or wrapped about the beads as shown in Fig. 9 to complete the tie-in of the beads.

The addition of chafer strips or other finishing operations may now be performed and the tire is shaped and vulcanized on air bags in molds or in presses equipped with means to expand the tire to its final form in the curing molds.

It will be seen that a novel and ingenious method has been devised for the efficient building of a tire of the special design or of any standard design. The important breaker element is correctly applied and of exact dimensions to secure the maximum value of the Emanueli invention.

What is claimed is:

1. The method of building a pneumatic tire comprising laying plies of tire building fabric about a drum the body of which is expansible, turning the edges of the fabric inwardly at the sides of the drum to form bead seats which are of lesser diameter than the outer diameter of the sides of the drum, locating beads in said bead seats, applying additional plies of fabric over the first said plies and over the beads, thereafter expanding the body of the drum to bring the central portion of the carcass to approximately its final circumference while moving the beads together, attaching a substantially inextensible breaker to the crown of the expanded carcass, applying a tread to the breaker, rolling the breaker and the tread onto the carcass, and then removing the tire from the drum and vulcanizing it.

2. The method of building a pneumatic tire comprising laying plies of tire building fabric about a drum the body of which is expansible, turning edges of plies inwardly at the sides of the drum incorporating beads of lesser diameter than the outer diameter of the sides of the drum in the inwardly turned edges of the fabric to complete the carcass, expanding the body of the drum to bring the central portion of the carcass to approximately its final circumference while moving the beads together; attaching a substantially inextensible breaker to the crown of the expanded carcass and applying a tread to the breaker after having centered said tread and said breaker by guide means, rolling the breaker and the tread onto the carcass, and then removing the tire from the drum and vulcanizing it.

3. A method in accordance with claim 1 in which the beads are propelled together at a rate proportionate to the increasing expansion of the body of the drum.

4. A method in accordance with claim 1 in which the tire is removed from the drum by collapsing the expansible central portion of the drum and moving further together both sides of said drum, ovalizing a bead of the tire, passing the said bead into the space between the sides of the drum and then over the other side of the drum.

5. The method of building a pneumatic tire comprising laying plies of tire building fabric about a drum the central portion which is expansible, incorporating beads in the edges of the plies to complete the carcass, bringing expansion limiting members over but spaced from the periphery of the drum, expanding the central portion of the carcass to approximately its final circumference within said members, attaching a breaker to the crown of the expanded carcass, applying a tread, rolling the breaker and the tread onto the carcass, and then removing the tire from the drum and vulcanizing the tire.

6. The method of building a pneumatic tire comprising laying plies of tire building fabric about a drum the central portion of which is expansible, incorporating beads in the edges of the plies to complete the carcass, bringing expansion limiting members over but spaced from the periphery of the drum, expanding the central portion of the carcass to approximately its final circumference within said members, while bringing the beads together, attaching a breaker to the crown of the expanded carcass, applying a tread, rolling the breaker and the tread onto the carcass, and then removing the tire from the drum and vulcanizing the tire.

7. The method of building a pneumatic tire comprising laying plies of tire building fabric about a drum the central portion of which is expansible, incorporating beads in the edges of the plies to complete the carcass, bringing expansion limiting members over but spaced from the periphery of the drum, expanding the central portion of the carcass to approximately its final circumference within said members while bringing the beads together, attaching a breaker to the crown of the expanded carcass and applying a tread after having centered said tread and said breaker by guide means, rolling the breaker and the tread onto the carcass, and then removing the tire from the drum and vulcanizing the tire.

8. A method in accordance with claim 6 in which the beads are moved together at a rate proportionate to the increasing expansion of the body of the drum.

9. A method in accordance with claim 5 in which the tire is removed from the drum by collapsing the expansible central portion of the drum and moving further together both sides of said drum, ovalizing a bead of the tire, passing the said bead over one side of the drum into the space between the sides of the drum and then over the other side of the drum.

10. A method in accordance with claim 5 in which the breaker is a substantially inextensible belt.

11. A method in accordance with claim 6 in which the breaker is a substantially inextensible belt.

12. The method of building a pneumatic tire comprising laying plies of tire building fabric about a drum the central portion of which is expansible, turning edges of the plies inwardly, incorporating beads in the inturned edges of the plies to complete the carcass, locating expansion limiting rings over but spaced from the periphery of the drum and spaced from one another, expanding the central portion of the carcass until further expansion of the carcass is restricted by the rings, attaching a breaker to the exposed area of the carcass between the rings, applying a tread, rolling the breaker and the tread onto the carcass, and then removing the tire from the drum and vulcanizing the tire.

13. The method of building a pneumatic tire comprising laying plies of tire building fabric about a drum the central portion of which is expansible, incorporating beads in the edges of the plies to complete the carcass, locating expansion limiting rings over but spaced from the periphery of the drum and spaced from one another, expanding the central portion of the carcass while bringing the beads together until further expansion of the carcass is restricted by the rings, attaching a breaker to the exposed area of the carcass between the rings, applying a tread, rolling the breaker and the tread onto the carcass, and then removing the tire from the drum and vulcanizing the tire.

14. The method of building a pneumatic tire comprising laying plies of tire building fabric about a drum the central portion of which is expansible, incorporating beads in the edges of the plies to complete the carcass, locating expansion limiting rings over but spaced from the periphery of the drum and spaced from one another, expanding the central portion of the carcass while bringing the beads together until further expansion of the carcass is restricted by the rings, attaching a breaker to the exposed area of the carcass between the rings, and applying a tread after having centered said tread and said breaker by guide means, rolling the breaker and the tread onto the carcass, and then removing the tire from the drum and vulcanizing it.

15. A method in accordance with claim 13 in which the beads are propelled together at a rate proportionate to the increasing expansion of the body of the drum.

16. A method in accordance with claim 12 in which the tire is removed from the drum by collapsing the expansible central portion of the drum and moving further together both sides of said drum, ovalizing a bead of the tire, passing the said bead over one side of the drum into the space between the sides of the drum and then over the other side of the drum.

17. A method according to claim 12 in which the breaker is a substantially inextensible belt.

18. A method according to claim 13 in which the breaker is a substantially inextensible belt.

19. The method of building a pneumatic tire comprising laying plies of tire building material about a drum the body of which is expansible, incorporating beads in the edges of the material and completing the carcass, expanding the body of the drum to bring the central portion of the carcass to approximately its final circumference while propelling the beads toward each other at a rate proportionate to the increasing expansion of the body of the drum, applying tread elements to the expanded carcass, removing the tire from the drum, and vulcanizing the tire.

20. The method of building a pneumatic tire comprising laying plies of tire building material about a drum the body of which is expansible, incorporating beads in the edges of the material and completing the carcass, inflating the body of the drum to bring the central portion of the carcass to approximately its final circumference while propelling the beads toward each other at a rate proportionate to the increasing expansion of the body of the drum, applying tread elements to the inflated carcass, evacuating the drum, ovalizing one bead of the tire, passing the said bead into the space between the sides of the drum and then over the other side of the drum to remove the tire from the drum, and vulcanizing the tire.

References Cited in the file of this patent

UNITED STATES PATENTS

| | | |
|---|---|---|
| 2,084,009 | Sohl | June 15, 1937 |
| 2,182,176 | Maranville | Dec. 5, 1939 |
| 2,565,071 | Frazier | Aug. 21, 1951 |
| 2,567,064 | Frazier | Sept. 4, 1951 |
| 2,614,951 | Iredell | Oct. 21, 1952 |
| 2,715,932 | Frazier | Aug. 23, 1955 |